UNITED STATES PATENT OFFICE.

JOHN A. ALVEY, OF ST. LOUIS, MISSOURI, ASSIGNOR TO ALVEY MANUFACTURING COMPANY, OF ST. LOUIS, MISSOURI, A CORPORATION OF MISSOURI.

BEARING FOR CONVEYER-ROLLERS.

1,241,324. Specification of Letters Patent. Patented Sept. 25, 1917.

Application filed June 14, 1917. Serial No. 174,701.

*To all whom it may concern:*

Be it known that I, JOHN A. ALVEY, a citizen of the United States, and a resident of the city of St. Louis and State of Missouri, have invented a new and useful Improvement in Bearings for Conveyer-Rollers, of which the following is a specification.

My invention relates to bearings for conveyer rollers and particularly to that type used in connection with gravity conveyers.

The principal object of my invention is to provide an inexpensive bearing for the ends of the roller which will be strong and durable and simple in construction.

Another object of the invention is to provide a conveyer roller which may be easily removed from its mount and quickly replaced when it becomes worn or damaged. A further object is to keep the balls in place on the bearing spindle when the conveyer roller is removed.

The invention consists in the combinations and arrangements of parts hereinafter described and claimed.

In the accompanying drawing, which forms part of this specification, like numerals refer to like parts whenever they occur.

Figure 1:
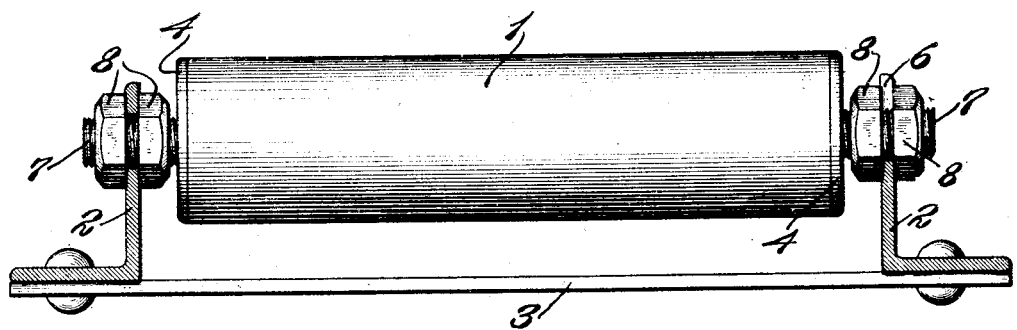
Figure 2:
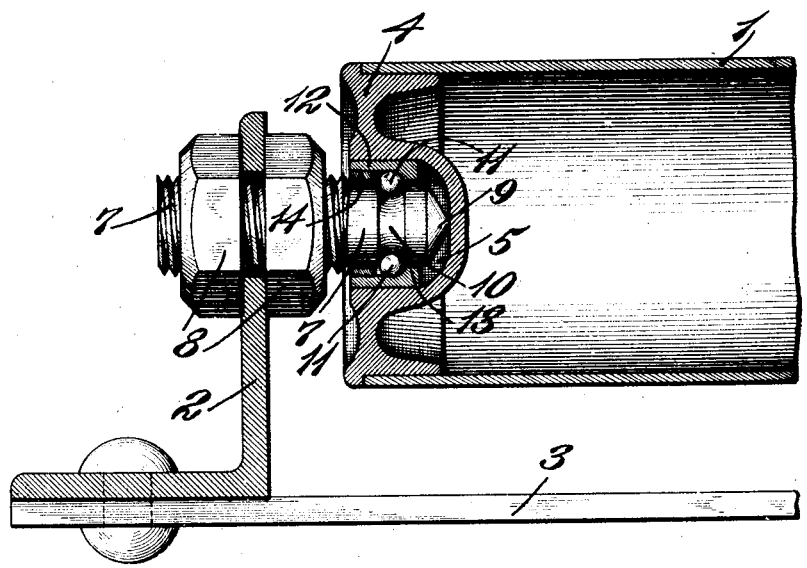

Figure 1 is a side elevation of a conveyer roller embodying my invention, the roller rail supports being shown in section; and Fig. 2 is a fragmentary longitudinal section through one end of the conveyer roller showing the bearing at that end of the roller.

In the construction illustrated in the drawing, the bearing is shown applied to an ordinary tubular conveyer roller 1, which is supported at its ends by roller rail supports 2 which are angle-shape in cross-section. The roller rail supports are connected at intervals by tie bars 3. Pressed into each end of the tubular conveyer roller 1, is a cap 4 which has a concave portion 5 at its center. The vertical leg of one of the roller supporting rails is provided with holes at suitable distances apart, and e vertical leg of the other roller suppor ; rail is provided with vertical slots 6 in .s top margin, spaced the same distance apart and in line with the holes in the opposite supporting rail.

Case-hardened bearing spindles 7, which are threaded for a portion of their length, extend through the holes in one of the supporting rails and through the vertical slots in the other supporting rail, and project into the concave portion of the cap and thereby support each end of the conveyer roller. Screwed on the threaded portion of the bearing spindles are jam nuts 8 which bear on opposite sides of the vertical leg of the roller supporting rails 2, thus firmly clamping the bearing spindle in the desired position.

The end of the bearing spindle projects into the concave portion 5 of the cap 4 and is tapered to a point 9 which engages the bottom of the concave portion 5 of the cap 4. Near the end of the bearing spindle adjacent the point 9 is a race-way 10 in which are mounted bearing balls 11. These bearing balls engage the inner wall of a case-hardened bearing ring 12 and are adapted to coöperate with a rounded face or flange 13 at one end of the bearing ring. The bearing ring fits snugly in the concave portion of the cap and rotates with the conveyer roller. The balls and bearing ring are held firmly in place on the bearing spindle by a locking ring 14 which is pressed into the bearing ring 12. The outer circumferential face of the locking ring is slightly burred thus holding it firmly in position when pressed into the bearing ring.

When it is desired to remove the conveyer roller from the supporting rails, the jam nuts on both rails are loosened and the spindle which rests in the slot is lifted and then the conveyer roller may be withdrawn from the opposite bearing spindle. When the point of the bearing spindle or the bottom of the concave portion of the cup becomes worn due to end thrust wear, this wear may be taken up by moving the spindle in and again clamping it in the desired position. When the supporting rails become bent, thus spreading them or bringing them together, the resulting looseness or tightness is taken care of in the same manner. When one of the supporting rails is bent either in an upwardly or downwardly direction, the conveyer roller will pivot on the balls and continue to run smoothly.

In assembling the bearings on the ends of the bearing spindles, the locking rings are first slipped over the pointed ends of the bearing spindles. The bearing rings are then slipped over the ends of the bearing spindles, the bearing balls then dropped into the ball races and the locking rings pressed into the large end of the bearing rings, thus firmly holding the balls in position on the bearing spindles.

The device described admits of considerable modification without departing from my invention.

I claim the following as my invention:

1. A roller conveyer comprising spaced supporting rails, oppositely disposed spaced bearing spindles adjustably secured to said supporting rails, bearing rings sleeved on the inner end of the bearing spindles, antifriction members arranged between the bearing rings and the bearing spindles, the bearing rings projecting into the ends of conveyer rollers and arranged for rotation with said rollers, and means for retaining the bearing rings and antifriction members on the spindles when the conveyer rollers are removed.

2. In a bearing for conveyer rollers, a roller, a cap fastened to each end of the roller having its central portion cup-shaped, an adjustably mounted bearing spindle located at each end of the roller, said bearing spindle projecting into and bearing against the bottom of the cup-shaped portion of the cap, a cylindrical ring sleeved on the bearing spindle and frictionally engaging the walls of the cup portion of the cap, antifriction members positioned around the bearing spindle, and means for retaining the antifriction members on the bearing spindle when the conveyer roller is withdrawn.

3. In a bearing for conveyer rollers, a roller, a cap having a depression in its central portion, adjustably mounted bearing spindles adjacent the ends of the roller, having balls mounted in race-ways extending around the periphery of the bearing spindles near their ends, a hardened steel ring sleeved on the ends of the bearing spindles and having a shouldered portion at one end, the inner wall of said ring and the shouldered portion engaging the bearing balls and the outer wall engaging the wall of the depression in the cap, and means located at the end of the hardened steel ring opposite the shoulder for holding the bearing balls and bearing ring on the spindle.

4. In a bearing for conveyer rollers, a tubular roller, a cap for each end of said roller, each cap being provided at its center with a depression, spindles projecting into each depression, a bearing ring for each spindle engaging the wall of the adjacent depression and spaced away from the spindle, bearing balls located in a race-way on each spindle and engaging the inner wall of the bearing ring, said bearing ring having a flange located at one end thereof to limit its endwise movement, and a retaining ring pressed into the opposite end of the bearing ring, that wall of said retaining ring which engages the inner wall of the bearing ring being roughened to hold the retaining ring firmly in the end of the bearing ring.

Signed at St. Louis, Missouri, this 11th day of June, 1917.

JOHN A. ALVEY.